Nov. 15, 1955 A. T. VAN URK ET AL 2,724,075
DEVICE COMPRISING A FERROMAGNETIC CIRCUIT
Filed Jan. 4, 1952

INVENTORS
Arend Thomas van Urk
Johannes Meyer Cluwen
BY
AGENT 2,724,075

DEVICE COMPRISING A FERROMAGNETIC CIRCUIT

Arend Thomas Van Urk and Johannes Meyer Cluwen, Eindhoven, Netherlands, assignors to Hartford National Bank and Trust Company, Hartford, Conn., as trustee Application January 4, 1952, Serial No. 264,982

Claims priority, application Netherlands April 23, 1951

3 Claims. (Cl. 317—158)

The invention relates to devices comprising a magnetic circuit manufactured of ferromagnetic material having a high permeability and a permanent magnet adjacent the magnetic circuit for producing a premagnetising field in said magnetic circuit.

The object of the invention is to provide a device in which the value of the premagnetising field can be controlled.

According to the invention a device comprising a magnetic circuit manufactured of ferromagnetic material having a high permeability and a permanent magnet adjacent the magnetic circuit for producing a premagnetising field in said magnetic circuit, is characterized in that the magnet is made of permanent magnetic material substantially having a non-cubic structure and a coercive field strength $B^Hc$ of at least 750 Oersteds, this magnet being movable with respect to at least part of the magnetic circuit in a direction, such that the area of the effective surface of the magnet which supplies the permagnetising flux to the magnetic circuit may be varied to provide control of the premagnetising field.

The term coercive field strength $B^Hc$ is to be understood to mean the field strength, at which the magnetic induction B is equal to zero and the term field strength of disappearance (intrinsic coercive force) $I^Hc$ is to be understood to mean that field strength at which the magnetisation I is equal to zero.

A device according to the invention may, for example, be comprised in a choke (transductor) for manual control of the inductance by means of the premagnetising field.

A device according to the invention may also be comprised in a magnetic field tube or a magnetron for producing a variable field at the area of the electron path.

A device according to the invention may, furthermore, be comprised in a magnetic electron lens, for example, for adjustment of the power of the lens.

It is known to vary a premagnetising field produced in a ferromagnetic circuit, for example, by providing an airgap in the circuit, the length of which is variable. However, the value of the premagnetising field often varies, according to a far from linear function with the length of the airgap, which renders the adjustment of this premagnetising field difficult.

The invention is based on recognition of the fact that with the use of permanent magnetic material substantially having a non-cubic crystal structure and a comparatively high coercive field strength $B^Hc$ of at least 750 Oertseds it is possible to include the permanent magnet itself in the ferromagnetic circuit so as to be movable such that the area of the effective surface of this magnet which supplies the magnetic flux to the ferromagnetic circuit, is varied, without affecting the permanent magnetic properties of such a magnet, even though the magnet is exposed to a strongly varying reluctance.

In order that the invention may be more clearly understood and readily carried into effect, it will now be described more fully with reference to the accompanying diagrammatic drawing, given by way of example, in which, Fig. 1 shows a premagnetising choke (transductor) according to the invention having variable premagnetisation.

Figure 1:
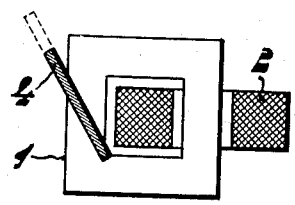

The transducer shown in Fig. 1 comprises a ferromagnetic circuit 1, a winding 2 and a permanent magnet 4 of a material having a coercive field strength $B^Hc$ of at least 750 Oersteds. This high coercive field strength permits of constructing the body 4 in the form of a thin plate having a comparatively large surface and magnetised in the direction of its smallest dimension, so that one end surface constitutes the magnetic north pole and the other end surface the magnetic south pole.

The magnet 4 is movable in a transverse direction; subsequent to the displacement, it may occupy, for example, the position shown in broken lines in Fig. 1. Thus the area of contact between the magnet 4 and the ferromagnetic circuit 1 is proportional to the displacement of the body 4, so that a corresponding, proportional variation of the premagnetising flux is produced, permitting an accurate adjustment of the required field. If desired, the field due to the magnet 4 may act in opposition to that due to the current passing through the winding 2 and be equal thereto.

With permanent magnetic materials having a cubic crystal structure, the part of the body 4 projecting beyond the ferromagnetic circuit 1 would become operative in an irreversible part of its cycle of magnetisation owing to the demagnetising field of its end surfaces, so that its permanent magnetic properties would be greatly reduced. With permanent magnetic materials having a non-cubic crystal structure, however, the irreversible part of the cycle of magnetisation occurs only in the proximity of the vanishing field strength (intrinsic coercive force) $I^Hc$ where the magnetisation I becomes equal to zero. This is due to the fact that the magnetisation of the various crystals then exhibits strong preferential directions, the magnetisation beginning to form an angle with the preferential direction when an external field H is applied. For this purpose a cyclic process is required, which process is reversible as long as this angle remains smaller than 90°, whereas with a cubic crystal structure the cyclic process becomes irreversible at angles considerably smaller than 90°.

The associated field H is, consequently, much greater with the non-cubic crystals than with the cubic crystals and it is found that it may lie in the proximity of the field strength $I^Hc$ and even below this value, whereas for the cubic crystals this field is smaller than the field strength $B^Hc$. However, since the demagnetising field of the end surfaces adjusts the permanent magnetic material at a field strength which invariably remains below the value of the field strength $B^Hc$, the non-cubic permanent magnetic material invariably becomes operative in the reversible part of its cycle magnetisation.

A material which fulfills such requirements is described in British Patent No. 708,127, and is characterised by a composition primarily of non-cubic crystals of polyoxides of iron and at least one of the metals lead, barium and strontium and, if desired, calcium and consequently may be made of comparatively cheap, plentiful raw materials. This material has, moreover, the advantage that the reversible permeability is near to 1, so that the total reluctance of the circuit 1 is not affected, if the body 4 is displaced.

Figure 2:
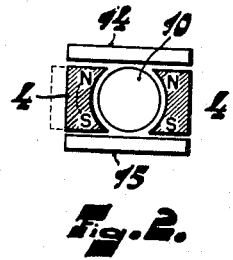
Fig. 2 shows a magnetic field tube according to the invention.

Referring to the device shown in Fig. 2, 10 designates a magnetic field tube, in which the electrons are under the action of a magnetic field provided between ferromagnetic bodies 14 and 15, and produced with the use of permanent magnets 4.

One or both of the magnets 4 is arranged to be movable in a direction approximately transverse to the magnetisation direction N–S e. g., to the position shown in broken lines. Thus the field produced is again proportional to the displacement of the magnets 4.

Figure 3A:
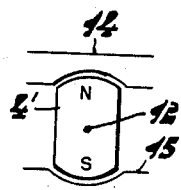
Figs. 3 and 3a show a magnetron according to the invention.
Figure 3:
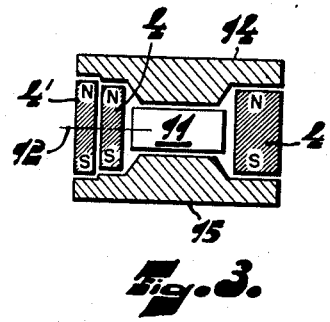

Fig. 3 shows a device in which a magnetron tube 11 is subjected to the action of a magnetic field provided between ferromagnetic parts 14 and 15 and produced with the use of stationary permanent magnets and a rotatable magnet 4', for example, rotatable about a shaft 12. (See also the side view of Fig. 3a.) The magnetic field may then be varied from a maximum value, as shown in the drawing, in which the magnetisation direction N–S of the magnets 4 and 4' is the same, to a minimum value, at which the magnet 4' is turned through half a revolution, the magnetisation direction of the magnet 4' then being opposite to that of the magnets 4.

Figure 4:
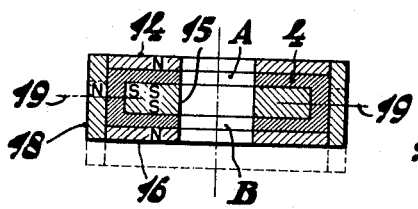
Figs. 4 and 5 show a magnetic electron lens, in which a magnetic coil may or may not be included.

Fig. 4 shows a magnetic electron lens for electron-optical purposes, the ferromatic circuit comprising annular parts 14, 15 and 16, which surround a permanent magnet 4, which may be built up from two rings and a cylinder, the magnet being magnetised at each point substantially in the direction of its smallest dimension. The ferromagnetic circuit is completed by a cylinder 18, movable relative to the magnet 4, with the use of which, upon displacement e. g., into the position shown in broken lines, the strength of the rotation-symmetrical magnetic field in the area of the transverse surfaces A and B and hence the power of the electron lens may be varied. In order to provide that the magnetic field is equally varied in the sectional areas A and B, to prevent image rotation, the ring 18 may be divided into halves, for example on a transverse plane 19, each of the two parts of the cylinder 18 being displaced equally in opposite directions.

Figure 5:
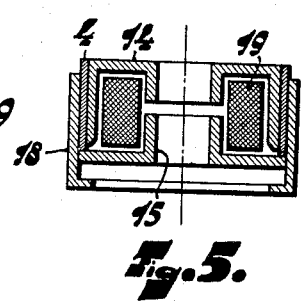

Fig. 5 shows an electron lens, in which in addition to stationary ferromagnetic parts 14 and 15, the permanent magnet 4 and the movable ferromagnetic part 18, with the use of which a coarse adjustment of the lens power is effected, a magnetic coil 20 is provided, permitting fine adjustment of the lens power. The current passing through the winding may, for example, be controlled as a function of the acceleration voltage of the electrons to be focussed by the lens in a manner such that the power of the lens remains constant, or as an alternative as a function of the deflection voltage of an electron beam projected by the lens onto a fluorescent screen, in a manner such that the focus of the image on the screen does not vary. In the latter case, the permanent magnetic material referred to in the above-noted British patent is of particular importance, since it is substantially non-conductive and losses for alternating voltages are reduced.

In each of the devices shown in the drawings the magnetisation directions may be reversed.

What we claim is:

1. A magnetic circuit arrangement comprising a ferrohagnetic body having an opening therein and a thin flat permanent magnet, said permanent magnet having a given axis of magnetization producing pole faces of opposite polarity and given cross-sectional area on opposite flat surfaces thereof, said permanent magnet being disposed in said opening of said ferromagnetic body with its pole faces abutting portions of said ferromagnetic body thereby producing a premagnetizing field of given intensity in said ferromagnetic body, said permanent magnet having a non-cubic crystal structure, a coercive field strength $B^Hc$ of at least 750 Oersteds and a permeability of about one, said magnet and ferromagnetic body being movable relative to one another in a direction transverse to said given axis of magnetization to vary the cross-sectional area of the pole faces abutting said ferromagnetic body and thereby vary the intensity of the premagnetizing field therein.

2. A magnetic circuit arrangement comprising a ferromagnetic body having an opening therein and a thin flat permanent magnet having a thickness dimension smaller than dimensions in directions perpendicular to its thickness dimension, said permanent magnet having a given axis of magnetization extending parallel to its thickness dimension producing pole faces of opposite polarity and given cross-sectional area on oppostie flat surfaces of said magnet, said permanent magnet being disposed in said opening of said ferromagnetic body with its pole faces abutting portions of said ferromagnetic body thereby producing a premagnetizing field of given intensity in said ferromagnetic body, said permanent magnet having a non-cubic crystal structure, a coercive field strength $B^Hc$ of at least 750 Oersteds and a permeability of about one, said magnet being moveable in said opening of said ferromagnetic body in a direction transverse to said given axis of magnetization to vary the cross-sectional area of the pole faces abutting said ferromagnetic body and thereby vary the intensity of the premagnetizing field therein.

3. A magnetic circuit arrangement comprising a ferromagnetic body including two opposed spaced apart portions defining an opening therebetween and a thin flat permanent magnet having a thickness dimension smaller than dimensions in directions perpendicular to its thickness dimension, said permanent magnet having a given axis of magnetization extending parallel to its thickness dimension producing pole faces of opposite polarity and given cross-sectional area on opposite flat surfaces thereof, said permanent magnet being disposed in said opening of said ferromagnetic body with its pole faces abutting portions of said ferromagnetic body thereby producing a premagnetizing field of given intensity in said ferromagnetic body, said permanent magnet having a non-cubic crystal structure, a coercive field strength $B^Hc$ of at least 750 Oersteds and a permeability of about one, one of said ferromagnetic portions being moveable relative to the other and the magnet in a direction transverse to said given axis of magnetization to vary the cross-sectional area of the pole faces abutting said ferromagnetic body and thereby vary the intensity of the premagnetizing field therein.

References Cited in the file of this patent

UNITED STATES PATENTS

| | | |
|---|---|---|
| 1,896,510 | Given | Feb. 7, 1933 |
| 2,000,378 | Deisch | May 7, 1935 |
| 2,466,028 | Klemperer | Apr. 5, 1949 |
| 2,503,155 | Harvey et al. | Apr. 4, 1950 |